United States Patent [19]

Kurschner et al.

[11] 4,396,058
[45] Aug. 2, 1983

[54] HEAT TRANSFER ELEMENT ASSEMBLY

[75] Inventors: Hermann E. Kurschner; William F. Harder, both of Wellsville, N.Y.

[73] Assignee: The Air Preheater Company, Wellsville, N.Y.

[21] Appl. No.: 323,501

[22] Filed: Nov. 23, 1981

[51] Int. Cl.$^3$ .............................................. F28D 19/00
[52] U.S. Cl. ......................................... 165/8; 165/10
[58] Field of Search ..................................... 165/8, 10

[56] References Cited

U.S. PATENT DOCUMENTS

| | | |
|---|---|---|
| 1,823,481 | 9/1931 | Zander. |
| 2,023,965 | 12/1935 | Lysholm ............................ 165/10 X |
| 2,438,851 | 3/1948 | Gates. |
| 2,596,642 | 5/1952 | Boestad ............................ 165/10 X |
| 2,696,976 | 12/1954 | Boestad et al. ........................ 165/10 |
| 2,940,736 | 6/1960 | Odman ............................ 165/10 X |
| 2,983,486 | 5/1961 | Rosenberg. |
| 3,463,222 | 8/1969 | Grames. |

Primary Examiner—Albert W. Davis, Jr.
Attorney, Agent, or Firm—William W. Habelt

[57] ABSTRACT

A rotary regenerative heat exchanger (2) for transferring heat from a hot fluid to a cold fluid by means of an assembly (30) of heat transfer element which is alternately contacted with the hot and cold fluid. The heat transfer element assembly (30) is comprised of a plurality of first and second heat absorbent plates (32,34) stacked alternately in spaced relationship. The spacing between adjacent first and second plates (32,34) are maintained apart by spacers which comprise bilobed folds (38A and 38B) crimped in the first plates (32) and second plates (34), respectively. The pitch of the folds (38B) is opposite to that of the folds (38A) to prevent nesting between adjacent plates.

5 Claims, 4 Drawing Figures

HEAT TRANSFER ELEMENT ASSEMBLY

BACKGROUND OF THE INVENTION

The present invention relates to heat transfer element and, more specifically, to an assembly of heat absorbent plates for use in a heat exchanger wherein heat is transferred by means of the plates from a hot heat exchange fluid to a cold heat exchange fluid. More particularly, the present invention relates to an assembly of heat exchange element adapted for use in a heat transfer apparatus of the rotary regenerative type wherein the heat transfer element is heated by contact with the hot gaseous heat exchange fluid and thereafter brought in contact with a cool gaseous heat exchange fluid to which the heat transfer element gives up its heat.

One type of heat exchange apparatus to which the present invention has particular application is the well-known rotary regenerative heater. A typical rotary regenerative heater has a cylindrical rotor divided into compartments in which are disposed and supported spaced heat transfer plates which as the rotor turns are alternately exposed to a stream of heating gas and then upon rotation of the rotor to a stream of cooler air or other gaseous fluid to be heated. As the heat transfer plates are exposed to the heating gas, they absorb heat therefrom and then when exposed to the cool air or other gaseous fluid to be heated, the heat absorbed from the heating gas by the heat transfer plates is transferred to the cooler gas. Most heat exchangers of this type have their heat transfer plates closely stacked in spaced relationship to provide a plurality of passageways between adjacent plates for flowing the heat exchange fluid therebetween.

In such a heat exchanger, the heat transfer capability of a heat exchanger of a given size is a function of the rate of heat transfer between the heat exchange fluid and the plate structure. However for commercial devices, the utility of a device is determined not alone by the coefficient of heat transfer obtained, but also by other factors such as the resistance to flow of the heat exchange fluid through the device, i.e., the pressure drop, the ease of cleaning the flow passages, the structural integrity of the heat transfer plates, as well as factors such as cost and weight of the plate structure. Ideally, the heat transfer plates will induce a highly turbulent flow through the passages therebetween in order to increase heat transfer from the heat exchange fluid to the plates while at the same time providing relatively low resistance to flow between the passages and also presenting a surface configuration which is readily cleanable.

To clean the heat transfer plates, it has been customary to provide soot blowers which deliver a blast of high pressure air or steam through the passages between the stacked heat transfer plates to dislodge any particulate deposits from the surface thereof and carry them away leaving a relatively clean surface. One problem encountered with this method of cleaning is that the force of the high pressure blowing medium on the relatively thin heat transfer plates can lead to cracking of the plates unless a certain amount of structural rigidity is designed into the stack assembly of heat transfer plates.

One solution to this problem is to crimp the individual heat transfer plates at frequent intervals to provide double-lobed notches which have one lobe extending away from the plate in one direction and the other lobe extending away from the plate in the opposite direction. Then when the plates are stacked together to form the heat transfer element, these notches serve not only to maintain adjacent plates at their proper distance from each other, but also to provide support between adjacent plates so that forces placed on the plates during the soot blowing operation can be equilibrated between the various plates making up the heat transfer element assembly. A heat transfer element assembly of this type is disclosed in U.S. Pat. No. 2,596,642.

Many other plate structures have been evolved in attempts to obtain cleanable structures with adequate heat transfer. See for example the following U.S. Pat. Nos.: 1,823,481; 2,023,965; 2,438,851; 2,983,486; and 3,463,222.

However, in a heat transfer element assembly of the type having a plurality of notched plates in a stacked array, the potential exists for the notches of adjacent plates to nest. That is, the notches may all become superimposed on one another so that the spacing between adjacent plates is lost and the adjacent plates touch along their entire length. This may occur from improper installation or movement of the plates relative to each other during normal operation or during the soot blowing procedure. In any case, this nesting must be avoided as fluid flow between adjacent plates is prevented when the plates become nested.

It is, therefore, an object of the present invention to provide an improved heat transfer element assembly wherein the structural integrity of the heat transfer plates is enhanced by notching while at the same time providing a design wherein nesting is precluded.

SUMMARY OF THE INVENTION

To the fulfillment of this object and other objects which will be evident from the description presented herein, the heat transfer element assembly of the present invention comprises a plurality of first and second heat absorbent plates stacked alternately in spaced relationship thereby providing a plurality of passageways between adjacent first and second plates for the flowing of a heat exchange fluid therebetween with spacers between the plates to maintain a predetermined distance between adjacent plates. The spacers comprise bilobed folds in the first and second plates.

In accordance with the present invention, the folds in the first plates have their first lobe projecting outwardly therefrom in a first direction and their second lobe projecting outwardly therefrom in a second direction which is opposite to the first direction, while the folds in the second plates have their first lobe projecting outwardly therefrom in the second direction and their second lobe projecting outwardly therefrom in the first direction. Thus, the folds in the second plate have a pitch which is opposite to the pitch of the folds in the first plate. Because the folds of adjacent plates are opposite in pitch, there is no way that the folds of adjacent plates can become superimposed. Therefore, nesting of adjacent first and second plates is precluded.

DESCRIPTION OF A PREFERRED EMBODIMENT

Figure 1:
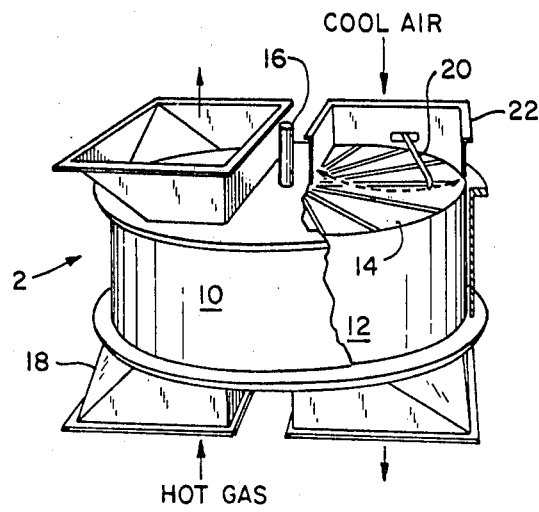
FIG. 1 is a perspective view of a rotary regenerative heat exchanger.

Referring now to the drawing and more particularly to FIG. 1, there is depicted therein a regenerative heat exchange apparatus 2 in which the heat transfer element assembly of the present invention may be utilized. The regenerative heat exchanger 2 comprises a housing 10 enclosing a rotor 12 wherein the heat transfer element assembly of the present invention is carried. The rotor 12 comprises a cylindrical shell 14 connected by radially extending partitions to the rotor post 16. A heating fluid enters the housing 10 through duct 18 while the fluid to be heated enters the housing 10 from the opposite end through duct 22.

The rotor 12 is turned about its axis by a motor connected to the rotor post 16 through suitable reduction gearing, not illustrated here. As the rotor 12 rotates, the heat transfer plates carried therein are first moved in contact with the heating fluid entering the housing through duct 18 to absorb heat therefrom and then into contact with the fluid to be heated entering the housing through duct 22. As the heating fluid passes over the heat transfer plates, the heat transfer plates absorb heat therefrom. As the fluid to be heated subsequently passes over the heat transfer plates, the fluid absorbs from the heat transfer plates the heat which the plates had picked up when in contact with the heating fluid.

As illustrated in FIG. 1, the regenerative heat exchanger 2 is often utilized as an air preheater wherein the heat absorbent element serves to transfer heat from hot flue gases generated in a fossil fuel-fired furnace to ambient air being supplied to the furnace as combustion air as a means of preheating the combustion air and raising overall combustion efficiency. Very often, the flue gas leaving the furnace is laden with particulate generated during the combustion process. This particulate has a tendency to deposit on the heat transfer plates particularly at the cold end of the heat exchanger where condensation of any moisture in the flue gas may occur.

In order to provide for periodic cleaning of the heat transfer element assembly, the heat exchanger is provided with a cleaning nozzle 20 disposed in the passage for the fluid to be heated adjacent the cold end of the rotor 12 and opposite the open end of the heat transfer element assembly. The cleaning nozzle 20 directs a high pressure cleaning fluid, typically steam, water, or air, through the plates as they rotate slowly while the nozzle itself sweeps across the end face of the rotor. As the high pressure fluid passes through the spaced heat transfer plates, turbulence in the fluid stream causes the heat transfer plates to vibrate so as to jar loose fly ash and other particulate deposits clinging thereto. The loosened particulate is then entrained in the high pressure fluid stream and carried out of the rotor.

Figure 2:
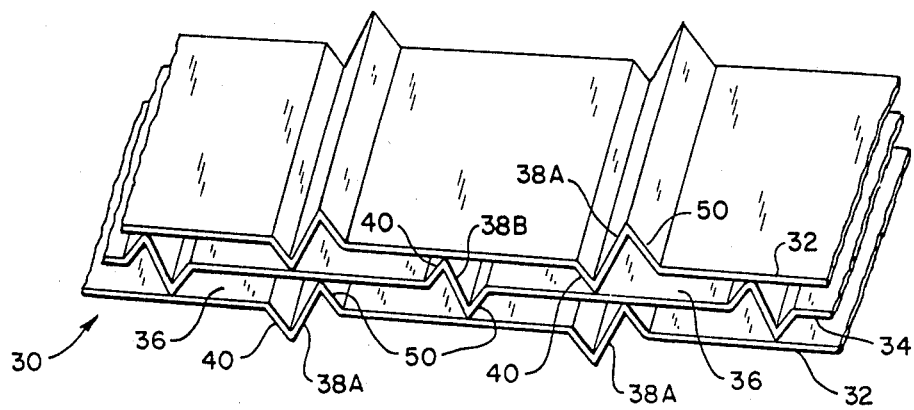
FIG. 2 is an enlarged perspective view of one embodiment of a heat transfer element assembly designed in accordance with the present invention.
Figure 3:
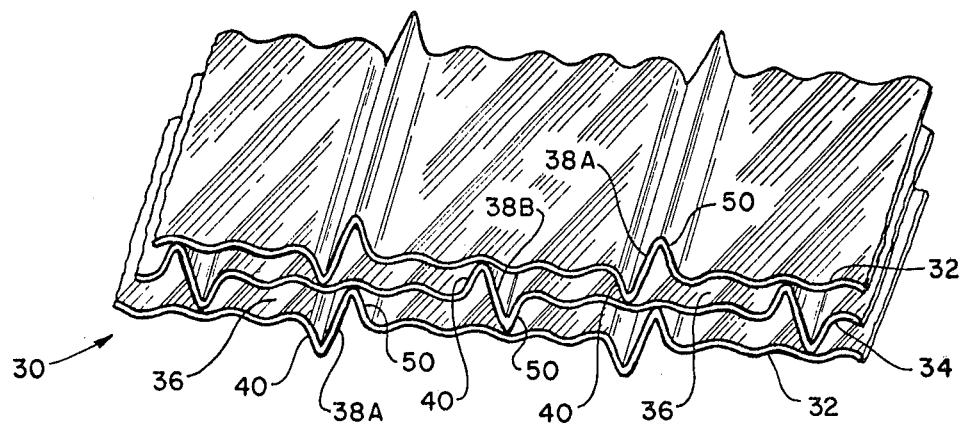
FIG. 3 is an enlarged perspective view of an alternate embodiment of a heat transfer element assembly designed in accordance with the present invention.
Figure 4:
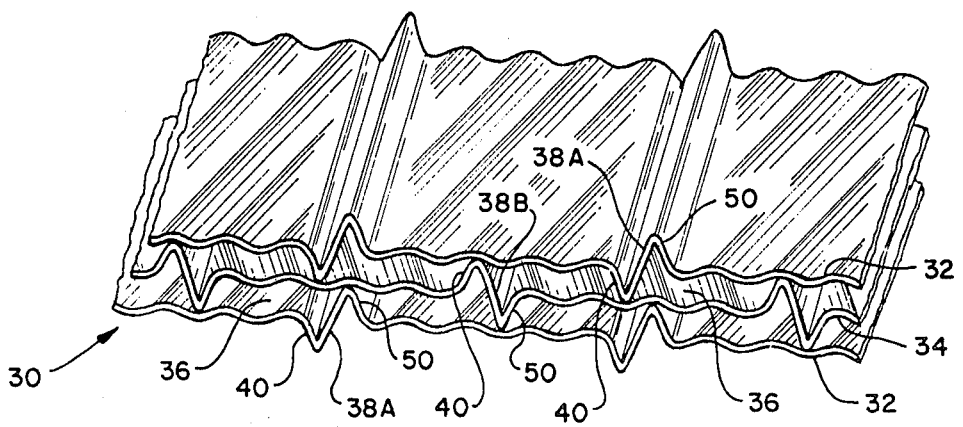
FIG. 4 is an enlarged perspective view of an additional alternate embodiment of a heat transfer element assembly designed in accordance with the present invention.

Referring now to FIGS. 2, 3, and 4, there is depicted therein three alternate embodiments of the heat transfer element assembly 30 designed in accordance with the present invention. As shown therein, each heat transfer element assembly is comprised of a plurality of first heat absorbent plates 32 and a plurality of second heat absorbent plates 34 stacked alternately in spaced relationship thereby providing a plurality of passageways 36 between adjacent first plates 32 and second plates 34. These passageways 36 provide a flow path for flowing a heat exchange fluid therebetween in heat exchange relationship with the plates. Spacers 38A, 38B are provided to maintain adjacent plates 32 and 34 a predetermined distance apart and keep flow passages 36 open.

The plates 32 and 34 are usually of thin sheet metal capable of being rolled or stamped to the desired configuration; however, the invention is not necessarily limited to use of metallic plates. The plates 32 and 34 may be of various surface configurations such as, but not limited to, a flat surface as illustrated in FIG. 2 or, preferably, a corrugated surface as illustrated in FIGS. 3 or 4. Corrugated plates provide a series of oblique furrows which are relatively shallow as compared to the distance between adjacent plates. Typically, the furrows are inclined at an acute angle to the flow of heat exchanger fluid over the plates as illustrated in FIGS. 3 and 4. The corrugations of adjacent plates may extend obliquely to the line of flow of heat exchange fluid between the plates in aligned manner as shown in FIG. 3 or, if desired, oppositely to each other as shown in FIG. 4.

The spacers 38A and B are formed by crimping the metal plates 32 and 34 to produce bilobed folds in the plates at spaced intervals. The bilobed folds 38A, 38B have first and second lobes, 40 and 50, respectively, projecting outwardly from the surface of the plates in opposite directions. Preferably, each lobe 40, 50 is in the form of a substantially V-shaped groove with the apex of the groove directed outwardly from the plate. Additionally, it is preferred that the folds 38A and B are aligned with the line of flow through the element assembly so that flow will be along the grooves so that the grooves do not offer a significant resistance to fluid flow through the element assembly.

In accordance with the present invention, the grooves 38A and the first heat absorbent plates 32 and the grooves 38B in the second heat absorbent plates 34 are opposite in pitch. That is, each fold 38A in the first plates 32 has its first lobe 40 projecting outwardly from the plate in a first direction and its second lobe 50 projecting outwardly from the plate in a second direction which is opposite to the first direction. At the same time, each fold 38B in the second plates 34 its first lobe 40 projecting outwardly from the plate in the second direction and its second lobe 50 projecting outwardly from the plate in the first direction, which is opposite to the second direction.

Because the folds 38B in the second plates 32 have a pitch opposite to the pitch of the folds 38A in the first plates 34, the nesting of adjacent plates which are alternate first and second plates 32 and 34, respectively, is precluded. If plates 32 and 34 were identical, that is if the folds 38A and the folds 38B had identical pitch, 100 percent nesting could occur between adjacent plates so as to completely close off flow passageways 36 between adjacent plates. Although it is preferred that the folds 38A and B also be alternately spaced, nesting is precluded in accordance with the present invention become of the opposite pitch of the folds 38A and 38B even if the folds 38A and 38B were to align.

While the heat transfer element assembly has been shown embodied in a rotary regenerative heat exchanger, it will be appreciated by those skilled in the art that the heat transfer element assembly of the present invention can be utilized in a number of other heat exchange apparatus not only of the regenerative type but also of the recuperative type. Additionally, various plate configurations, some of which have been alluded to herein, may be readily incorporated into the heat transfer element assembly of the present invention by those skilled in the art. We, therefore, intend by the appended claims to cover the modifications alluded to herein as well as all other modifications which may fall within the true spirit and scope of the present invention.

We claim:

1. An assembly of heat transfer element for a heat exchanger comprising a plurality of first heat absorbent plates and a plurality of second heat absorbent plates stacked alternately in spaced relationship thereby providing a plurality of passageways between adjacent first and second plates for flowing a heat exchange fluid therebetween; and spacers maintained a predetermined distance between adjacent plates, said spacers comprising bilobed folds in said first and second plates, the folds in said first plates having their first lobe projecting outwardly from said first plate in a first direction and their second lobe projecting outwardly from said first plate in a second direction opposite to the first direction, and the folds in said second plates having their first lobe projecting outwardly from said second plate in the second direction and their second lobe projecting outwardly from said second plate in the first direction, the folds in said second plates thereby having a pitch opposite to the pitch of the folds in said first plate so as to preclude adjacent first and second plates from nesting.

2. A heat transfer element assembly as recited in claim 1 wherein said first and second lobes of the bilobed folds comprise substantially V-shaped grooves having the apex of the V directed outwardly from said plate.

3. A heat transfer element assembly as recited in claim 1 or 2 wherein said first and second plates are undulated.

4. A heat transfer element assembly as recited in claim 1 or 2 wherein said first and second plates are alternatively stacked such that the folds in said first plate lie in alignment with each other and said second plate also lie in alignment with each other but are disposed midway between the aligned folds of said first plate.

5. A heat transfer element assembly as recited in claim 3 wherein said first and second plates are undulated.

* * * * *